Dec. 23, 1952 C. G. MINOR 2,622,851

BARREL SUPPORTING AND COOLING DEVICE

Filed March 17, 1949 6 Sheets-Sheet 1

INVENTOR.
Charles G. Minor
BY
Barnes, Kisselle, Laughlin & Raisch
ATTORNEYS.

Dec. 23, 1952 C. G. MINOR 2,622,851

BARREL SUPPORTING AND COOLING DEVICE

Filed March 17, 1949 6 Sheets-Sheet 2

INVENTOR.
Charles G. Minor

BY
Barnes, Kisselle, Laughlin & Raisch

ATTORNEYS.

INVENTOR.
Charles G. Minor
BY
Barnes, Kisselle, Laughlin & Raisch
ATTORNEYS.

BARREL SUPPORTING AND COOLING DEVICE

Filed March 17, 1949 6 Sheets-Sheet 4

INVENTOR.
Charles G. Minor
BY
Barnes, Kisselle, Laughlin & Raisch
ATTORNEYS.

Dec. 23, 1952 C. G. MINOR 2,622,851

BARREL SUPPORTING AND COOLING DEVICE

Filed March 17, 1949 6 Sheets-Sheet 5

INVENTOR.
Charles G. Minor
BY
Barnes, Kisselle, Laughlin & Raisch
ATTORNEYS.

Dec. 23, 1952 C. G. MINOR 2,622,851

BARREL SUPPORTING AND COOLING DEVICE

Filed March 17, 1949 6 Sheets-Sheet 6

INVENTOR.
Charles G. Minor
BY
Barnes, Kisselle, Laughlin & Raisch
ATTORNEYS.

Patented Dec. 23, 1952 2,622,851

UNITED STATES PATENT OFFICE 2,622,851

BARREL SUPPORTING AND COOLING DEVICE

Charles G. Minor, Evanston, Ill., assignor of one-half to Charles F. Welsh, Highland Park, Mich.; Harry H. Gmeiner executor of Charles G. Minor, deceased Application March 17, 1949, Serial No. 81,982

4 Claims. (Cl. 257—14)

This invention has to do with heat transfer, and it is concerned particularly with the transfer of heat with respect to substance in a container, wherein the container may quickly and easily be placed into and removed from heat exchange relationship with means for effecting heat transfer.

More specifically, the invention is concerned with the cooling or heating of material in containers. The invention is directly particularly to the handling of substance in relatively large containers, and while the substance to be cooled or heated may be of large variety, a good example is beverage or beer which may be handled in kegs or similar containers. Accordingly, in order to specifically disclose the invention, beer kegs have been selected as the exemplary containers.

The general objects of the invention are to provide heat transfer apparatus with respect to which the kegs, or other containers, may, with facility and expedience, be placed in heat transfer position and remain in such position during such time as the contents thereof are to be treated, or dispensed or used. The removal of the container either empty or full may also be made easily. It is also an object of the invention to provide for cooling beer, for example, wherein the standard keg may be employed; that is to say, no change or variation is required in the kegs which are now in use. Of course, the substance does not have to be dispensed while it is being cooled but this is one of the advantages of the invention.

In accordance with the invention, heat transfer apparatus is provided wherein heat transfer elements may and preferably do have contact with the exterior surfaces of the containers either directly or indirectly and in this connection a metal container is preferred. A further object of the invention is to provide means for handling and manipulating the container and a portion of the heat transfer mechanism, in the process of placing or removing a container from heat transfer position.

An apparatus constructed in accordance with the invention is shown in the accompanying drawings and, as aforesaid, while any substance or material in a container may be used with the present invention, the beer keg is selected and shown in the drawings for the purpose of clearly setting forth the invention.

Figure 1:
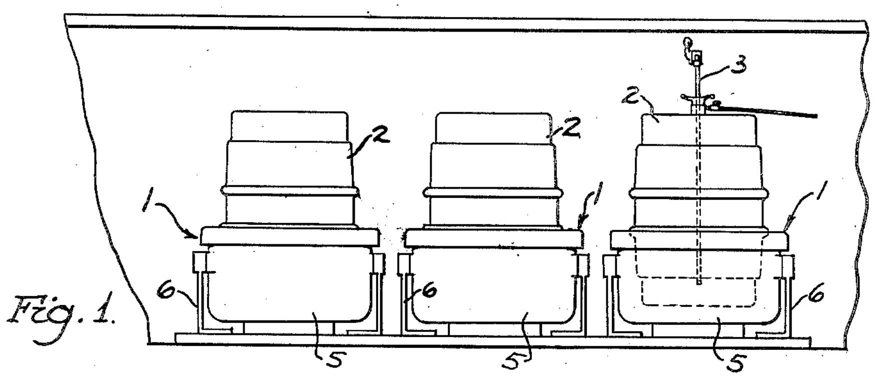
Fig. 1 is a view showing several containers, specifically beer kegs, in cooling position with respect to cooling apparatus of the present invention.

The cooling units may be used singly or in any suitable number and, as shown in Fig. 1, there are three cooling units, each generally indicated at 1, with each having a container therein in the form of a keg 2. Hereafter, in the detailed description, the word "keg" will be used for convenience but any other suitable term may be used, and as shown in Fig. 1, one keg is equipped with a draft tube 3 and related couplings for drawing the contents from the keg. It will be noted that the draft tube extends down into the keg near the bottom thereof.

Figures 2, 3, 4:
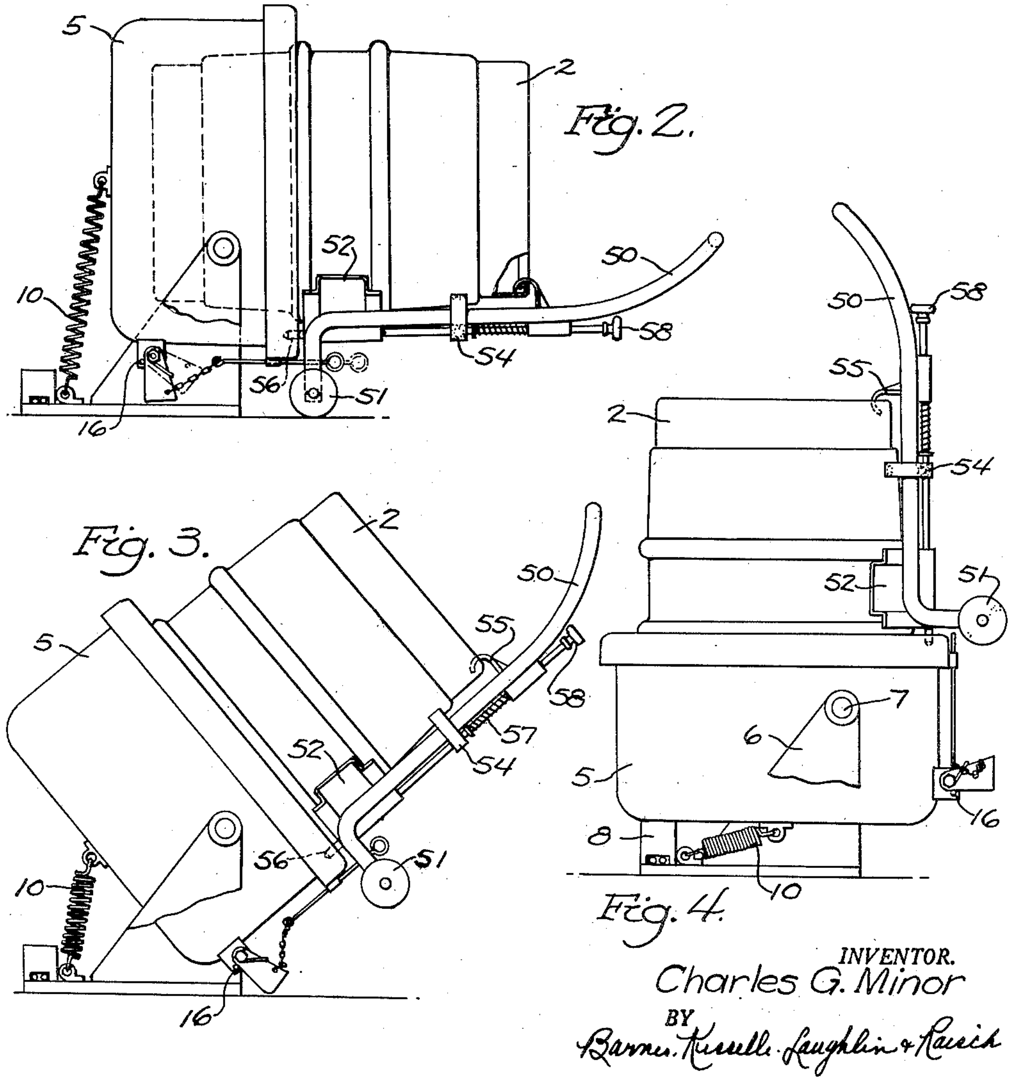
Fig. 2 is a view illustrating how a container may be introduced into the cooling unit.
Fig. 3 is a view showing an intermediate position of the parts as a container is placed in or removed from a cooling unit.
Fig. 4 is a view showing the container and the cooling unit in operating position with the container handling truck attached.
Figures 5, 6:
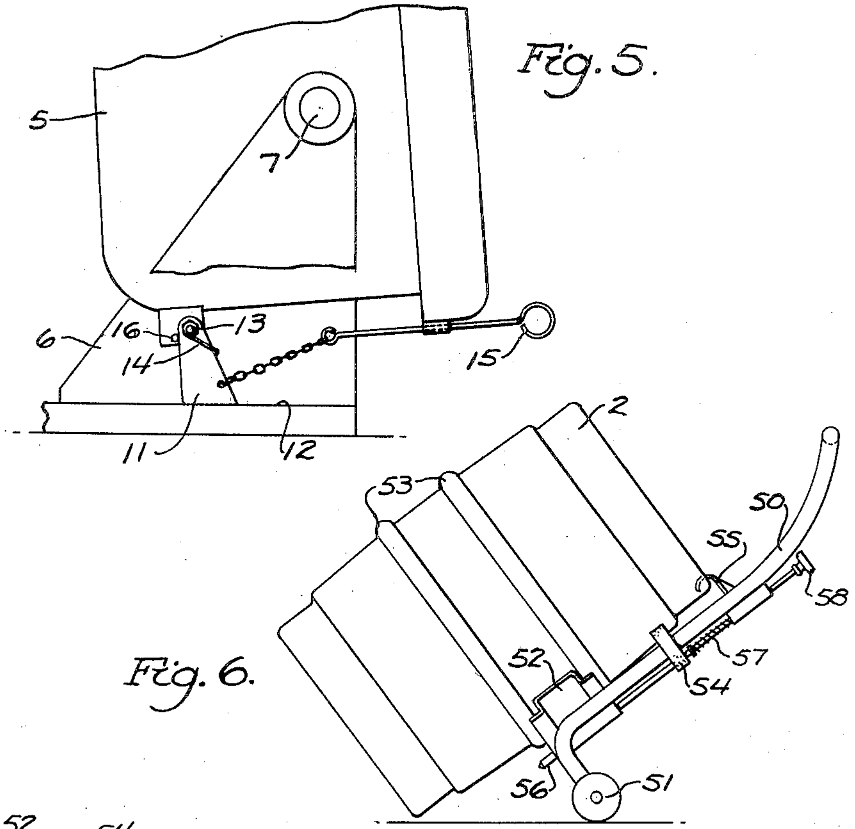
Fig. 5 is a detailed view illustrating the cooling unit structure and a detent for holding the same.
Fig. 6 is a side elevational view showing substantially a position of the container and the truck during movement of the truck.

Each unit comprises a receptacle 5 with an open end pivotally mounted on suitable standards 6 on an axis 7 positioned off center. When the receptacle is in vertical position it, therefore, is stable and may rest upon a suitable block or support 8. The receptacle may be swung on its axis through about 90° to a position as indicated in Figs. 2 and 5. There is advantageously a spring 10 fastened to the bottom of the container which is flexed as the container is turned to a substantially horizontal position so that the spring tends to return the receptacle to normal vertical position. A check or detent 11 is arranged to engage the surface 12 of a support element, this detent being pivotally mounted to the receptacle as at 13, and acted upon by a spring 14. The spring urges the detent clockwise as Fig. 5 is viewed and thus holds the receptacle in loading position against the action of the spring 10. The detent may be released by an operating element 15 slidably mounted on the side of the receptacle and its movement under the action of spring 14 is limited by stop 16.

Figure 9:
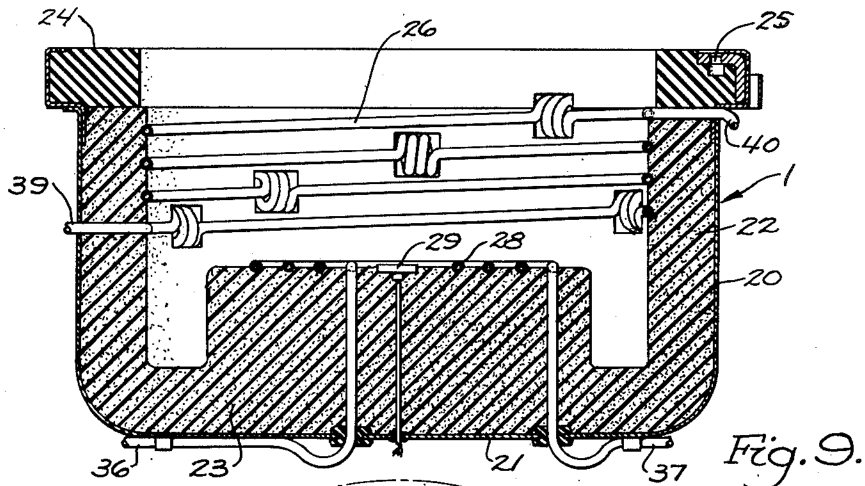
Fig. 9 is a sectional view taken through one form of cooling unit showing the cooling coils.

One form of receptacle may be constructed as shown in Fig. 9 with a peripheral side wall 20 and a bottom wall 21 and having an interior of relatively soft elastic material, such as rubber or sponge rubber, natural or synthetic. This material has side wall portions 22 and a bottom portion 23 which is elevated, as shown. The top of the receptacle may also be lined with similar material, as shown at 24, and the receptacle is provided with an element having a keeper socket 25 for purposes which will presently appear. A tubing coil for conducting a coolant, such as a cooling liquid or refrigerant, is shown at 26, and this coil of tubing may preferably be partially embedded in the lining 22 and provided so that each convolution has one or more coils 27 therein so that each convolution may expand and contract to some extent. There is also a coil of tubing 28 which may be partially embedded in the central piece 23. A thermal control element may be positioned in the unit as shown at 29.

Figure 12:
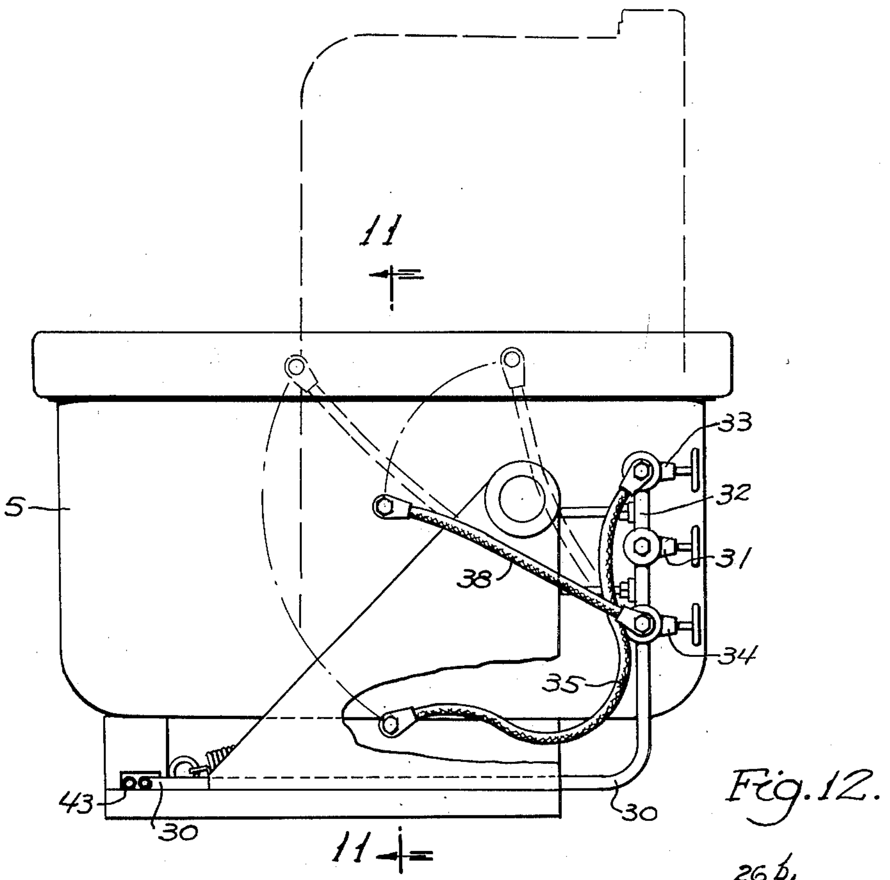
Fig. 12 is a view illustrating a cooling unit and showing a conduit system for the inlet of cooling medium.
Figure 13:
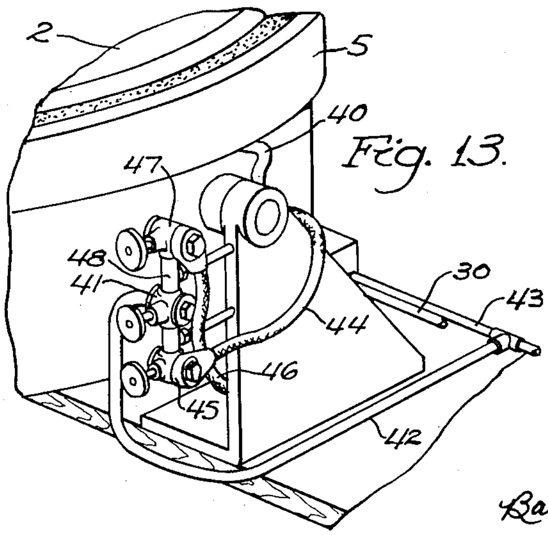
Fig. 13 is a view of the opposite side of the unit illustrating the conduit system for the outlet of cooling medium.
Figure 15:
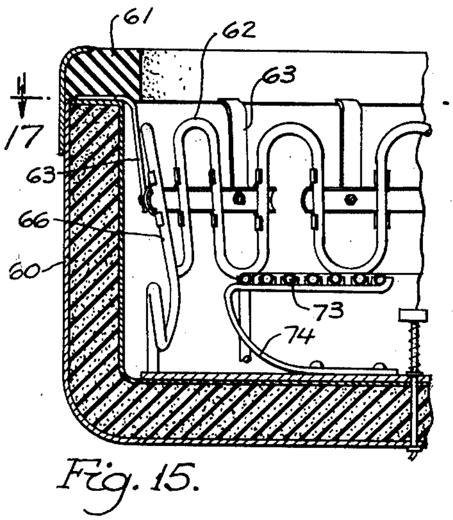
Fig. 15 is a sectional view illustrating the structure of a modified form of cooling unit.

The coolant or heating medium may be conducted to the coils, as shown in Figs. 12 and 13. The inlet conduit for the coolant is shown at 30 which extends to a valve 31 which may be used to open and close the line 30 and extending from the valve 31 is a header or manifold 32 provided with a valve 33 and a valve 34. A flexible conduit 35 extends from the valve 33 and connects to a line 36 which extends to the coil 28. The outlet line 37 leads from the coil 28. A flexible conduit 38 connects to the inlet 39 of the coil 26, the coil 26 having an outlet line 40.

A similar valve arrangement is shown in Fig. 13 for the outlet side of the coils, this comprising a center valve 41 connected to a conduit 42, which is in turn connected to the outgoing or return conduit 43. Leading from the conduit 40 is a flexible conduit 44 which connects to valve 45 and a flexible conduit 46 connects the outlet 37 to valve 47, the valves 45 and 47 being connected to the main valve 41 by the header 48. It will thus be seen that refrigerant or other cooling or heating medium may flow through the coils in the receptacle or receiver and further that each receiver may be cut off from the medium and isolated therefrom completely by closing valves 31 and 41, and still further the coil 26 and the coil 28 may individualy be cut off from the supply of medium by controlling valve 33 and 34 and 45 and 47. No attempt is made herein to show in detail refrigerating or heating mechanism. The manual valves are shown for simplification it being understood that other types of valves and controls may be used.

Figure 7:
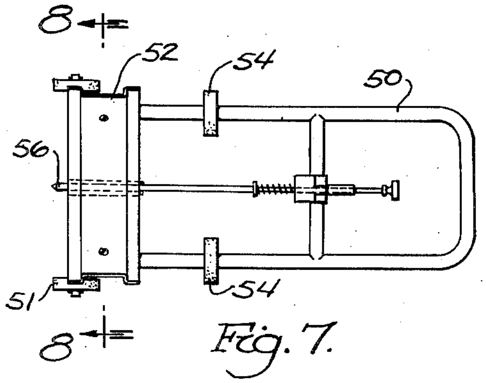
Fig. 7 is an ensmalled plan view of the truck.
Figure 8:
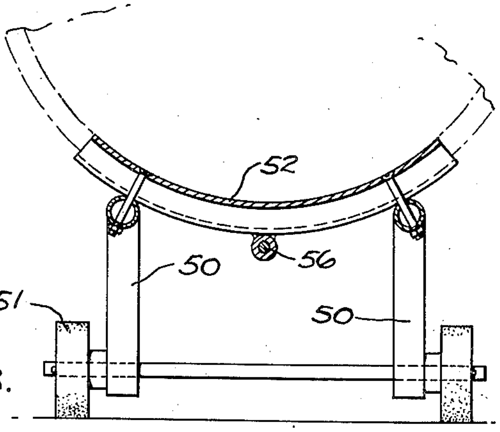
Fig. 8 is an enlarged cross sectional view taken substantially on line 8—8 of Fig. 7 showing truck features.

A hand truck which may be used in placing a keg into a receiver and removing the same therefrom is shown in Figs. 6 and 7 as having a body part 50 with wheels or rollers 51 and a saddle 52 for receiving a keg and preferably arranged to fit in between the usual external beads 53 of a keg. For stabilizing the keg rubber bumper elements 54 are provided so that a keg not only rests upon a saddle but may be engaged against the rubber bumpers with the bumpers compressed. The truck is provided with hook 55 for engaging over the chimb of the keg and it is also provided with a spring pressed latching bolt 56. This bolt is normally yieldably advanced by a spring 57 and it may be retracted by a suitable handle 58.

The truck is preferably fairly light in weight and the keg may be applied thereto as shown in Fig. 6. With the receiver positioned substantially horizontally, as shown in Fig. 2, the truck may be manipulated until the keg is about in a horizontal position and then the keg is shoved into the receiver. The spring pressed bolt 56 moves into the keeper 25. The operator now releases the detent 6 and the spring 10 aids in swinging the receiver and the keg and the truck counter-clockwise as Figs. 2 and 3 are viewed, and the truck moves with the receiver and the keg as a part of the entire unit. As the center of gravity shifts and the combined unit tends to right itself to a vertical position, the operator, by holding the truck handle, may let the receiver down easily on its stop 8. The parts are now in the position as shown in Fig. 4 and the truck may be removed by retracting the bolt 56 so that the lower end of the truck may be swung out slightly and then the hook 55 disengaged from the chimb. When the draft tube 3 is applied the contents of the keg may be dispensed.

Figures 10, 11:
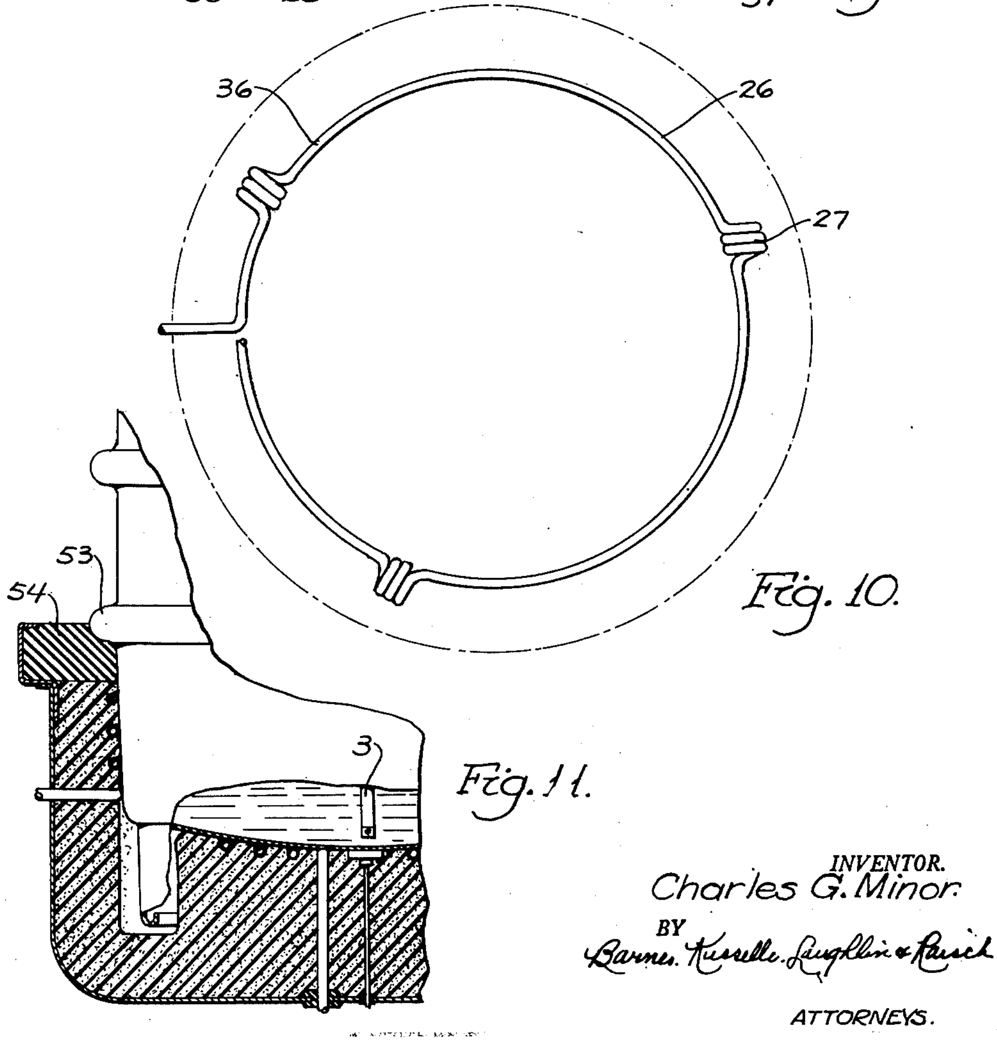
Fig. 10 is a somewhat diagrammatic view illustrating cooling coil detail.
Fig. 11 is a view largely in section and with parts broken away showing a container in the cooling unit illustrated in Fig. 9.

When the keg is placed into a receiver of the construction shown in Fig. 9, portions of the keg directly engage the coolant coils as shown in Fig. 11. The keg, conventionally, is somewhat tapered at its ends, and it engages and expands the coils 26 so that there is a good surface to surface engagement between the coils and the wall of the keg for efficient heat transfer. Also, the bottom of the keg or the head of the keg seats upon the portion 23 and it is deformed somewhat and the coils 28 have a good surface to surface contact with the head of the keg. Thus, the contents of the keg is primarily cooled in the lower portion thereof and the draft tube, as shown in Fig. 11, is usually positioned to take the contents from near the bottom of the container. The keg is stabilized by its lower bead 53 seating against the element 54, as shown in Fig. 11 and this closes the receptacle.

Figure 14:
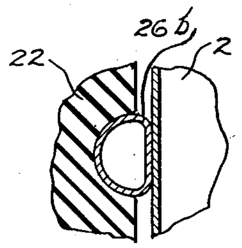
Fig. 14 is an enlarged cross sectional view showing a modified form of cooling coil.

A modified form of coil for the refrigerant is shown at 26b in Fig. 14. In this form the tubing of the coil has a flat side for contact with the keg 2.

Figure 16:
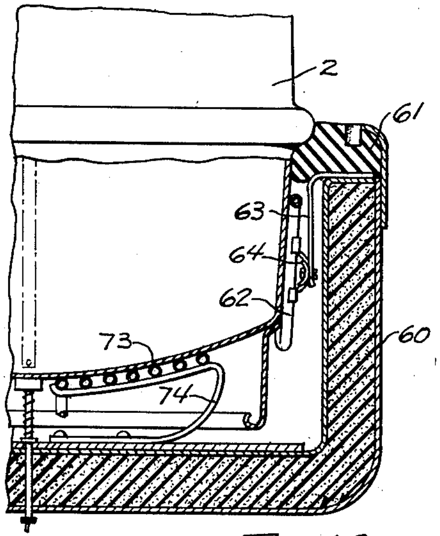
Fig. 16 is a view similar to Fig. 15 showing a container in place.
Figure 17:
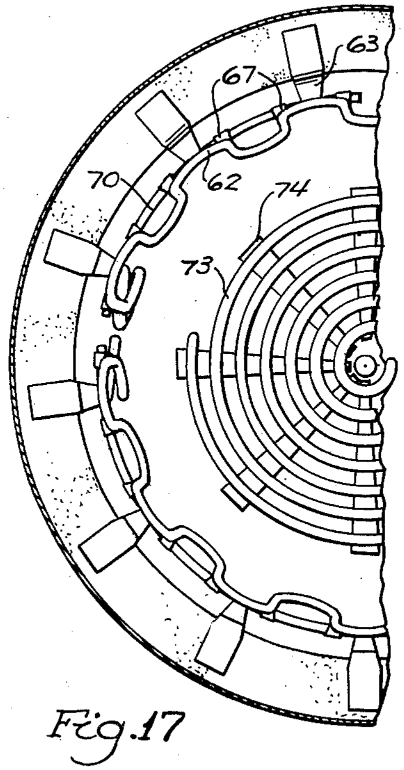
Fig. 17 is a view taken substantially on line 17—17 of Fig. 15 showing the interior of the unit.
Figure 18:
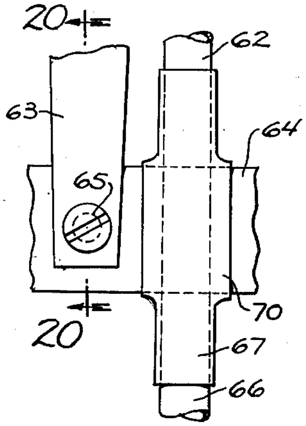
Fig. 18 is an enlarged detail view showing features of construction.
Figure 19:
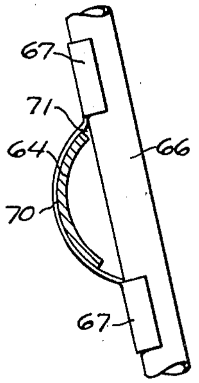
Fig. 19 is an enlarged view showing the mounting of the cooling conduit.
Figure 20:
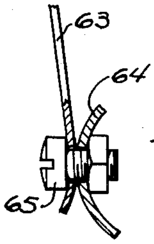
Fig. 20 is a sectional view taken on line 20—20 of Fig. 18.

In the modified form shown in Figs. 15 to 20, the walls of the container may be of insulated double construction and preferably having a rubber or rubber-like rim element 61. In this case, the coil 62 is of serpentine form extending around the inner walls of the container and held in place by a plurality of spring arms 63. The spring arms are connected to brackets 64 as by means of bolts 65 and there are preferably a plurality of brackets throughout the circumference, there being conveniently four of such brackets. Each vertical run of the serpentine coil, as shown at 66 is preferably secured, as by means of soldering or the like, to clip members 67, each of which has an arcuate center part 70 for engaging over the bracket 64 which also is arcuate in form. A clearance is provided as at 71 so that the upper portions of the serpentine coil may normally be positioned outwardly and be flexed inwardly with resultant swinging action of the clips on the brackets 64 when the keg is inserted and it strikes the lower portions of the coil. Accordingly, when a keg is positioned as shown in Fig. 16, the arms 63 are flexed and the upper portions of the serpentine coil shift inwardly relative to the lower portions. In this way, the serpentine coils has a good surface to surface contact with the keg. Also in this form, a coil of tubing 73 for engaging the bottom of the keg is supported by a plurality of spring arms 74 so that the bottom coil may conform to the shape of the head of the keg and provide a good surface to surface contact for the heat transfer.

Figure 21:
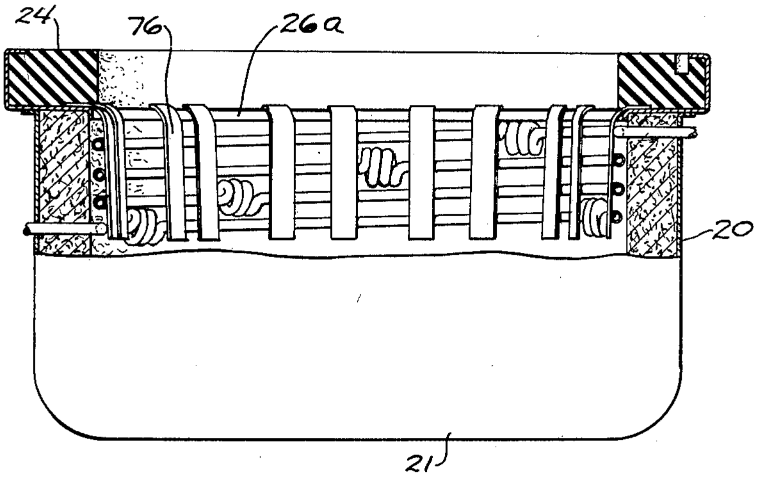
Fig. 21 is a view partly in section and view partly cut away showing a modified form of construction.
Figure 22:
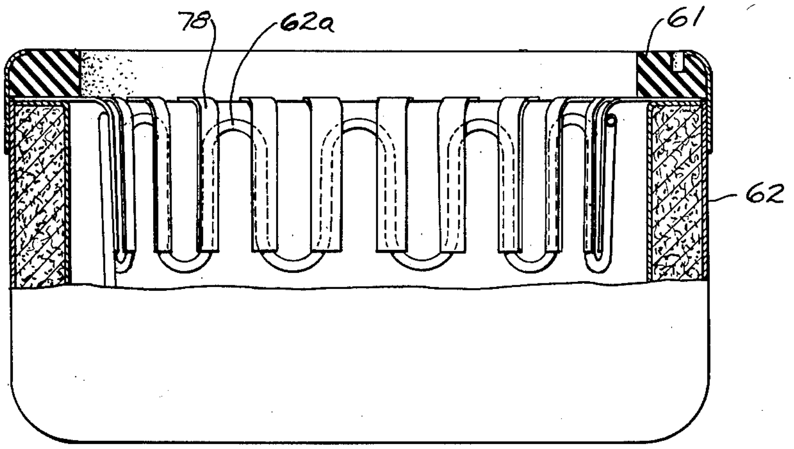
Fig. 22 is a view partly in section and with parts cut away showing a further modified construction.

In the further modified form as shown in Fig. 21, the structure is similar to that shown in Fig. 9, but the coil 26a is protected by a plurality of spring arms 76 which may be anchored at the top of the receiver and extend inside of the coil 26a for direct contact with the keg. In this case, the arms 76 are preferably soldered or welded to the convolutions of the coil 26a at the places of intersection for conduction purposes. In the form shown in Fig. 22, the general structure follows that shown in Fig. 15 but the coils are protected by spring arms 78, there being preferably one spring arm for overlapping each run of the serpentine coil 62a. These arms 78 are preferably soldered or otherwise joined to the runs 62a for conduction purposes although it is not necessary to the invention to secure either the arms 76 or the arms 78 to the tubing of the coils. The other structural elements shown in Figs. 21 and 22 are the same as those previously described and have the same reference characters applied thereto.

It will, at once, be appreciated that a single heat transfer unit may be used or that the units may be employed in suitable numbers depending upon the requirements. It will be observed also that the contents of a keg may be maintained fully cooled or heated and efficiently cooled or heated without any modification of the keg whatever. Moreover, empty kegs may be removed from and full kegs may be placed into the receiver with great facility and with a minimum of expenditure of time and physical effort. The term "coolant" is used herein to cover any sort of a fluid coolant whether it be a coolant which stays in liquid form or one which changes from liquid to gaseous form in its cooling function.

I claim:

1. An apparatus for receiving, holding and refrigerating a keg for beer or the like so that the keg is held on a vertical axis and so that the contents thereof may be dispensed comprising, a receptacle having a bottom wall and side walls, the receptacle being open at its end opposite the bottom wall, said receptacle having a depth less than the axial dimension of the keg so as to receive one end of a keg with a portion of the keg projecting therefrom, an internal facing element of rubber material on the receptacle substantially at its open end for engaging the keg so that the keg is stabilized and the receptacle closed thereby, refrigerant conducting means within the receptacle in heat exchange relationship with the received end of the keg, means pivotally mounting the receptacle so that it is normally in an upwardly opening position to hold a keg as stated, said receptacle being pivotal to a substantially horizontally opening position for receiving a keg.

2. An apparatus for receiving, holding and refrigerating a keg for beer or the like so that the keg is held on a vertical axis and so that the contents thereof may be dispensed comprising, a receptacle having a bottom wall and side walls, the receptacle being open at its end opposite the bottom wall, said receptacle having a depth less than the axial dimension of a keg so as to receive one end of a keg with a portion of the keg projecting therefrom, an internal facing element of rubber material on the receptacle near its open end for engaging the keg so that the keg is stabilized and the receptacle closed thereby, refrigerant conducting means within the receptacle in heat exchange relationship with the received end of the keg, means pivotally mounting the receptacle on an off center relative to a center line through and normal to the bottom wall so that the receptacle is normally in an upwardly opening position to hold a keg as stated, said receptacle being pivotal to a substantially horizontally opening position for receiving a keg.

3. An apparatus for receiving, holding and refrigerating a keg for beer or the like so that the keg is held on a vertical axis and so that the contents thereof may be dispensed comprising, a receptacle having a bottom wall and side walls, the receptacle being open at its end opposite the bottom wall, said receptacle having a depth less than the axial dimension of a keg so as to receive one end of a keg with a portion of the keg projecting therefrom, an internal facing element of rubber material on the receptacle substantially at its open end for engaging the keg so that the keg is stabilized and the receptacle closed thereby, refrigerant conducting means extending along the inner wall of the receptacle, said conducting means being flexible and adapted to engage the received end of the keg, means pivotally mounting the receptacle off center relative to a center line through and normal to the bottom wall so that the receptacle is normally in an upwardly opening position to hold a keg as stated, said receptacle being pivotal to a substantially horizontally opening position for receiving a keg, and spring means normally holding the receptacle in upwardly opening position and resisting its pivotal movement to horizontally opening position.

4. An apparatus for receiving, holding and refrigerating a container, such as a keg for beer, so that the keg is held on a vertical axis and so that the contents thereof may be dispensed comprising, a receptacle having a bottom wall and side walls and having a depth less than that of the end to end dimension of the container so as to receive one end of the container with the other end of the container projecting therefrom, a liner element within the container adjacent its open end for engaging and sealing against the container to hold the container stabilized and to close the space within the receptacle when the container is in place, refrigerant conducting means in the form of tubing coils extending around the interior of the receptacle so as to extend around the end of a container therein to embrace and engage in direct heat exchange relationship the end of the container therein, the coils of the tubing being expandable to yieldably engage and conform to the shape of the end of the container therein.

CHARLES G. MINOR.

REFERENCES CITED

The following references are of record in the file of this patent:

UNITED STATES PATENTS

| Number | Name | Date |
|---|---|---|
| 875,270 | Irish | Dec. 31, 1907 |
| 1,422,064 | Kane | July 4, 1922 |
| 1,536,497 | Horvath | May 5, 1925 |
| 1,846,413 | Abbe | Feb. 23, 1932 |
| 1,942,741 | Austin | Jan. 9, 1934 |
| 1,957,199 | Clifford | May 1, 1934 |
| 1,975,046 | Larkin | Sept. 25, 1934 |
| 2,074,365 | Clifford | Mar. 23, 1937 |
| 2,180,237 | Henderson | Nov. 14, 1939 |
| 2,181,553 | Hiller | Nov. 28, 1939 |
| 2,231,329 | Goll | Feb. 11, 1941 |
| 2,237,246 | Askin | Apr. 1, 1941 |
| 2,249,051 | Schulse | July 15, 1941 |
| 2,283,818 | Reiser | May 19, 1942 |
| 2,343,717 | Turnau | Mar. 7, 1944 |
| 2,477,294 | Fuller | July 26, 1949 |
| 2,494,512 | Kafer et al. | Jan. 10, 1950 |